United States Patent [19]
Andresen et al.

[11] Patent Number: 5,680,526
[45] Date of Patent: Oct. 21, 1997

[54] METHOD AND SYSTEM FOR SELECTIVELY RENDERING IMAGE DATA IN A BI-LEVEL OR MULTI-LEVEL FORMAT

[75] Inventors: Kevin W. Andresen, Campbell; Allen M. Chan, Sunnyvale; Robert C. Fishman, Sunnyvale; Ted W. Walker, Sunnyvale, all of Calif.

[73] Assignee: Apple Computer, Inc., Cupertino, Calif.

[21] Appl. No.: 473,653

[22] Filed: Jun. 6, 1995

[51] Int. Cl.⁶ .................................................. G06T 11/00
[52] U.S. Cl. ............................................ 395/131; 395/133
[58] Field of Search ............................... 395/131, 116, 395/164, 788, 790, 114, 115, 133, 522, 523; 345/116, 155; 382/237, 270

[56] References Cited

U.S. PATENT DOCUMENTS

| | | | |
|---|---|---|---|
| 4,733,230 | 3/1988 | Kurihara et al. | 345/138 |
| 5,062,057 | 10/1991 | Blacken et al. | 345/200 |
| 5,383,037 | 1/1995 | Kimura et al. | 358/539 |
| 5,432,870 | 7/1995 | Schwartz | 382/232 |
| 5,521,990 | 5/1996 | Ishizawa et al. | 382/270 |
| 5,600,768 | 2/1997 | Andresen | 395/135 |

FOREIGN PATENT DOCUMENTS

| | | |
|---|---|---|
| 0395032 | 10/1990 | European Pat. Off. . |
| 0660583 | 6/1995 | European Pat. Off. . |
| 5286170 | 11/1993 | Japan . |

*Primary Examiner*—Mark K. Zimmerman
*Assistant Examiner*—Stephen Hong
*Attorney, Agent, or Firm*—Burns, Doane, Swecker & Mathis

[57] ABSTRACT

An image to be generated is analyzed to determine whether it is comprised solely of bi-level color data. If so, an indication is provided to a rendering device that a simpler rendering procedure, suitable for bi-level data, can be employed. However, full color information pertaining to the image is retained. If the rendering device is able to process the image data in a bi-level format, it does so, to thereby improve performance and reduce the amount of memory capacity that is required. If multi-level data is detected, the bi-level data is expanded and full color rendering is carried out in a conventional fashion.

12 Claims, 4 Drawing Sheets

METHOD AND SYSTEM FOR SELECTIVELY RENDERING IMAGE DATA IN A BI-LEVEL OR MULTI-LEVEL FORMAT

FIELD OF THE INVENTION

The present invention is directed to imaging systems, and more particularly to the manner in which bi-level data is processed to produce an image on output devices in such systems.

BACKGROUND OF THE INVENTION

Output devices for imaging systems, such as display monitors and printers, operate as raster devices, whose output images comprise a two-dimensional grid of picture elements, or pixels, that is known as a "raster." To generate an image on a screen or a page, these devices store a representation in memory of a display value for each pixel in the image. This stored representation of the image is referred to as a "pixel map" (sometimes abbreviated as "pixmap"), or a frame buffer. The stored value for each pixel represents the amount of each color component that is present in the image at a sample point corresponding to the location of the pixel. For example, a color monitor represents colors in terms of their red, green and blue components. Therefore, the frame buffer for a color monitor stores values which indicate how much red, green and blue is to be displayed in the image at the point corresponding to the pixel. Conversely, a color printer may represent colors in terms of cyan, magenta and yellow components. Consequently, its frame buffer stores pixel values that represent the amount of cyan, magenta and yellow to be printed in each pixel. A monochrome display device or printer may have the capability to represent different intensity levels of one color, e.g. different grayscale levels. In such a case, the frame buffer stores values relating to the intensity levels. In this regard, it is to be noted that the term "color", as used in the context of the present invention, can refer to grayscale levels as well as chromatic values.

In the operation of an exemplary imaging system, a user might be running a graphics application program on a computer. The user can instruct the program to draw an object, such as a square, at a particular location on the screen of the display monitor. In response to the user inputs, the graphics program issues high level instructions to the computer's operating system to draw the objects. A display manager, or similar such portion of the computer's operating system for controlling the operation of the display monitor, interprets the commands into low-level instructions for the monitor. As part of this interpretation process, the high-level description of the object from the application program is translated into individual pixel display values that are stored in the frame buffer. This process of converting the high-level graphical data into pixel values is known as rendering. A similar type of operation occurs when the image is to be printed on a printer. In this case, the frame buffer which stores the pixel values is sometimes known as a page buffer.

Each pixel of an image describes a uniquely addressable area of the output device which can reproduce one or more display or print values. If a device can represent more than one intermediate value of gray, it is called a grayscale device. The number of levels is usually a power of two which enables pixel values to be binary encoded. For example, a pixel which can represent 4 levels of gray can be encoded in a 2-bit binary number, where each binary value indexes one of the levels of gray. The number of bits that represent the display value in a pixel is often called pixel depth. Color devices with a pixel depth of 8 bits per component are often called true color, continuous tone, or contone devices. The term "continuous tone" is actually a misnomer when used in connection with these devices, since the pixels are quantized to discrete digital values. Therefore, the term "multilevel" is used to describe all devices with a pixel depth greater than one, whether color or grayscale.

A device which represents colors with one bit per pixel is known as a bilevel device. Basically, the state of the bit can indicate whether a pixel is "on", e.g. a black dot is printed, or "off", where nothing is printed and the pixel takes on the color of the background medium, such as a sheet of paper. Alternatively, the state of the pixel might indicate two different colors that are to be printed or displayed.

Bi-level devices represent intermediate levels via techniques such as halftoning or dithering, which attempt to reproduce a desired level, or intensity, over an area of several pixels. Multilevel devices can represent intermediate levels directly within a single pixel. Therefore, 50% gray reproduced on a monochrome bi-level device looks different than 50% gray reproduced on a multilevel device. However, black and white look the same on both devices—each pixel is either entirely on, e.g., black, or entirely off, to represent white.

The rendering process requires an appreciable amount of processing power, and hence time, in the overall generation of an image. For a high resolution image, the frame buffer also requires a significant amount of storage space. For example, in a color printer which is capable of printing an image with a resolution of 600 dots per inch (DPI) and where each color in the color space is represented by a 32-bit word, a frame buffer having a capacity of 128 megabytes is required to store all of the data which represents one page of information. The time required to render and store this much data is significant, and can appreciably slow down the overall printing process. Even in a multilevel monochrome device, in which each pixel might be represented with eight bits of information, the rendering time is still a significant part of the total printing process.

To reduce the amount of memory that is required, high resolution printers often compress the image data. However, the compression and decompression of the data are additional steps that can slow down the overall printing process. For this reason, it is desirable to optimize the rendering process wherever possible, to improve the speed with which printing can take place and/or reduce the memory requirements of a printer.

Related copending application Ser. No. 08/483,453 filed Jun. 6, 1995 discloses one technique to optimize the rendering process for those cases in which the image is comprised of achromatic, i.e. grayscale, data. Basically, in that technique, when a page of an image is comprised solely of achromatic data, the rendering process is carried out with respect to one component of the output device's color space, and the other components refer to the same rendered information during the printing or display operation. This approach provides a significant reduction in the required rendering time, while maintaining the flexibility to generate full color images as necessary.

The present invention is directed to a another technique for optimizing the rendering process, which pertains to the particular case in which an image consists of bi-level data. The most common example of this case is a page of text, which is comprised of black and white textual image data.

In the past, it has been possible to configure multilevel output devices to act as bi-level devices. In such a mode of operation, only a single bit per pixel is stored in the frame buffer. A smaller and simpler frame buffer can be used, and rendering time decreases proportionately to the pixel depth. This approach has two significant disadvantages, however. First, it requires explicit intervention by the user. Secondly, when configured as a bi-level device, it is impossible for the device to display intermediate shades of gray or color directly. Rather, a method such as halftoning must be employed.

SUMMARY OF THE INVENTION

In accordance with the present invention, the advantages of bi-level operation are achieved without requiring an image output device to be explicitly configured to operate as a bi-level device. An image to be generated on a printer or a display monitor is analyzed to determine whether it is made up of at most two colors, or two levels of a single color. If so, an indication is provided to a rendering device that a simpler rendering procedure, suitable for bi-level data, can be employed. However, complete data relating the color and/or pixel depth of the image is retained. If the rendering device is capable of processing the image data in a bi-level format, it does so, to thereby reduce the rendering time and the amount of memory capacity that is required. If, however, the rendering device is not capable of operating in a bi-level mode, or conditions relating to the generation of an image make such a mode undesirable, rendering is carried out in a conventional fashion, i.e., in a full-color and/or multi-level mode. With this approach, the advantages of bi-level image processing are utilized. In addition, because of the reduced memory requirements, compression and decompression may not be necessary. However, the flexibility to process an image in a conventional manner is maintained, thereby making the invention suitable for application in a variety of different types of image output devices.

Further features of the invention, as well as the advantages attained thereby, are explained in detail hereinafter with reference to the illustrated embodiments.

DETAILED DESCRIPTION

To facilitate an understanding of the present invention, it is described hereinafter in the context of a specific embodiment. In particular, reference is made to the implementation of the invention in a color printer which employs a CMY color space to represent colors. It will be appreciated, however, that the practical applications of the invention are not limited to this particular embodiment. Rather, the invention can be employed in other types of image output devices, such as CRT monitors and LCD display screens, which employ any of a variety of multi-level color spaces, including monochrome devices which employ a single-component color space. In this regard, it is to be noted that the reference to two colors in the following description does not necessarily mean two different colors. Rather, it also denotes two different levels of the same color, e.g. two different shades of gray.

Figure 1:
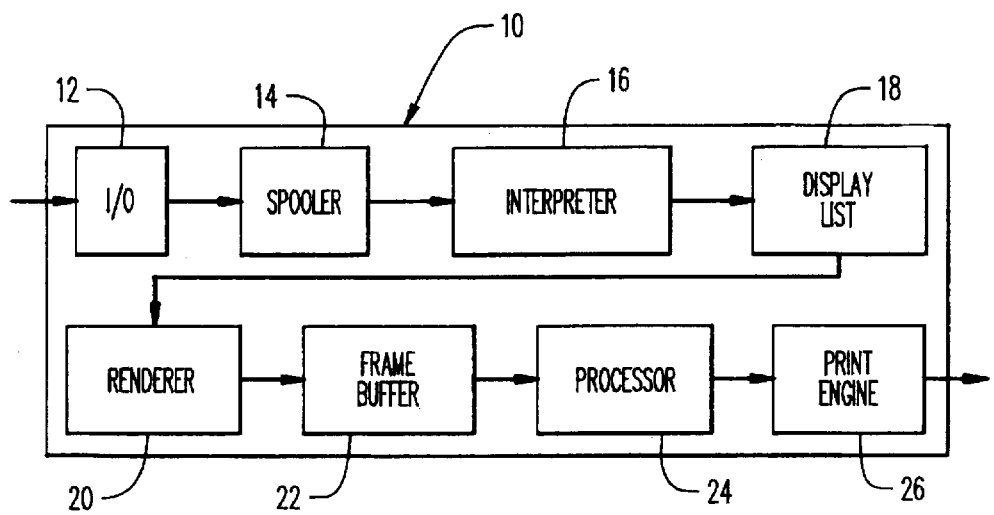
FIG. 1 is a block diagram of the main subsystems which make up a color printer of the type in which the present invention can be employed.

FIG. 1 is a block diagram of the major components of a color printer, of a type in which the present invention can be implemented. Referring thereto, the printer 10 includes an I/O controller 12 that is connected to one or more I/O ports for communication with computers and other external sources of data to be printed. A spooler 14 accumulates image data received from the external sources, and stores the data until it is ready to be processed for printing. It will be appreciated, of course, that the spooler is optional and can be incorporated in an external device, rather than the printer itself. An interpreter 16 receives a stream of image data and issues calls which cause the desired image to be drawn, or printed, on the paper. These calls can be of two basic types. One set of calls identifies the appearance state of objects to be drawn. This appearance state indicates the color of the object, as well as other appearance-related factors, such as patterns or the like. The other set of calls describes the object to be drawn, such as a rectangle, a line, a particular character of text, or the like. In the illustrated embodiment of the printer, these calls are stored in an intermediate form, known as a display list 18, or a metafile.

The information on the display list is provided to a renderer 20. The renderer converts the object-based information from the interpreter 16 into individual pixel display values, which are stored in a frame buffer 22. The pixel display values stored in the frame buffer can undergo optional processing within one or more processors 24. For example, the display values can be compressed and/or decompressed, or undergo halftone processing. Ultimately, these display values are supplied to a print engine 26, to control the actual printing of the desired image. The print engine could be of the laser beam printer type or the ink jet type, for example.

In an alternative embodiment of a printer, the display list 18 can be eliminated. In this embodiment, object information from the interpreter 16 is directly fed to the renderer 20, to be dynamically rendered as it is received.

Figure 2:
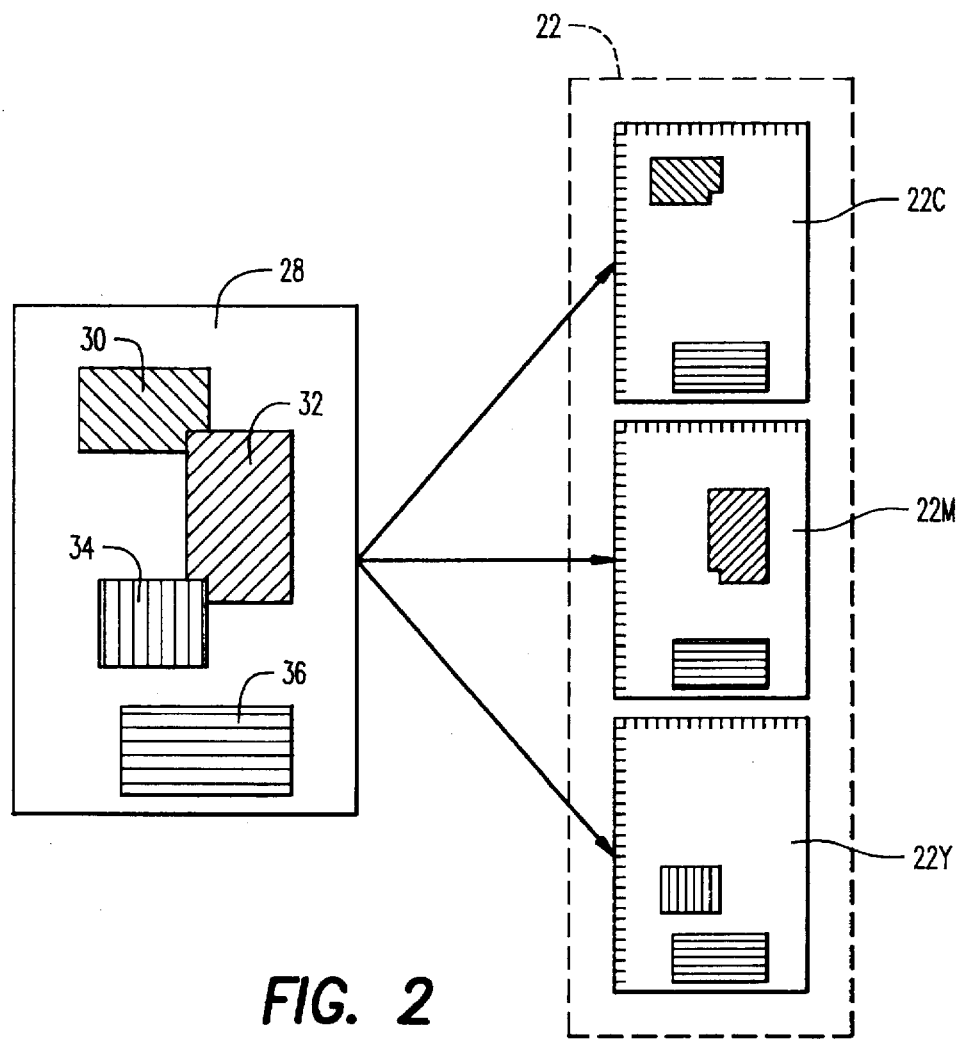
FIG. 2 is a schematic representation of a full-color rendering process.

The basic process which is undertaken in the renderer 20 is illustrated in greater detail in FIG. 2 for a printer which represents colors by means of a three-component color space comprised of cyan, magenta and yellow. An exemplary document 28 to be printed on the printer contains four objects. For the sake of simplicity, these objects are represented as solid rectangles. In practice, the objects can be any geometric shape, lines, or characters of text. In this particular example, each object has a different color, as represented by the different shading. The rectangle 30 is cyan, the rectangle 32 is magenta, the rectangle 34 is yellow, and the rectangle 36 is black.

The frame buffer 22 is comprised of three sections, 22C, 22M and 22Y, which respectively correspond to the three color components of the printer's color space. In the illustrated example, these sections are depicted as separate planes, in which each plane comprises a pixel map, having a storage location for each pixel in the image to be generated, as represented by the grid marks along the edges of each plane. In practice, the information pertaining to the respective color components can be stored in the frame buffer in any desired manner. For example, the three color component values for a given pixel can be stored together as three continuous bytes in the memory.

In operation, the interpreter 16 issues a call to set the state of the printer to print the color cyan, and then issues a call to draw the rectangle 30. In response to the calls to draw the cyan rectangle 30, the renderer 20 stores information in the frame buffer section 22C which describes each pixel in the image that is to contain the color cyan. This stored information includes the saturation value, or intensity, for the displayed color at the respective pixel.

The renderer 20 operates in a similar manner for the calls pertaining to the drawing of the magenta rectangle 32 and the yellow rectangle 34. In particular, information pertaining to the saturation value of the magenta rectangle 32 is stored at appropriate address locations in the magenta section 22M of the frame buffer, and saturation values for the yellow rectangle 34 are stored in the yellow section 22Y of the frame buffer.

In a device which employs a CMY color space, the color black is represented by 100% saturation of each of the cyan, magenta and yellow components. Therefore, in response to the calls to draw the black rectangle 36, the renderer 20 stores the appropriate saturation information for the same pixel in each of the three frame buffer sections 22C, 22M and 22Y.

Once all of the information for the page of data is stored in the frame buffer 22, it is provided to the print engine 26, with any optional intermediate processing. More particularly, the information from each of the three sections 22C, 22M and 22Y of the frame buffer is individually provided to the print engine in three separate steps. For example, all of the cyan information may be printed, followed by all of the magenta information and then all of the yellow information, to form a composite image.

In a monochrome printer, all of the image data is rendered into a single plane. In this case, the colors cyan, magenta and yellow for the objects 30, 32 and 34 are represented as different grayscale levels. The information stored in the frame buffer 22 indicates the respective grayscale level for the pixels covered by each object.

It can be appreciated that the time required to render objects in an image consumes a significant portion of the overall processing that is required to generate the image. For example, in a three-color output device having a pixel depth of eight bits, twenty-four bits must be calculated and stored for each pixel in the image. Furthermore, a significant amount of memory is required to store all of the information in the frame buffer that is necessary to produce a high quality, high resolution image, particularly for color images. To the extent that the rendering time and/or memory requirements can be reduced, the overall process for generating an image can be made more efficient.

Figure 3:
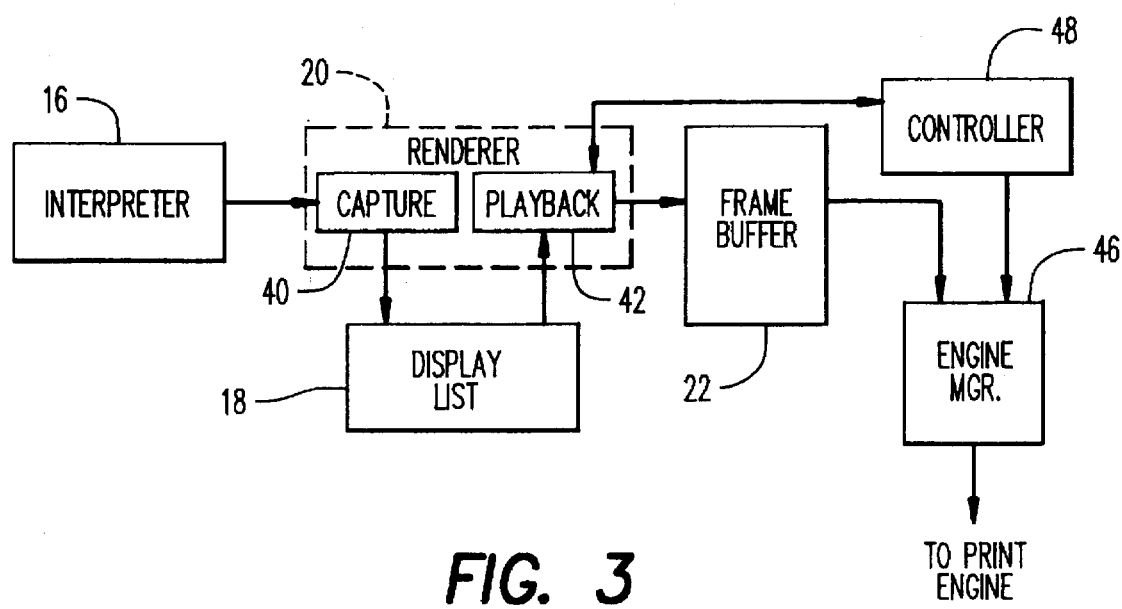
FIG. 3 is a more detailed block diagram of the rendering device.

Storing image data in an intermediate form, such as the display list 18, provides an opportunity to analyze and preprocess image data in a manner which permits the rendering process to be optimized. To provide a more complete understanding of this concept, the manner in which image data is handled by the interpreter and the renderer is described in greater detail with reference to FIG. 3. Referring thereto, the interpreter 16 issues calls to draw objects. In the illustrated embodiment, these calls are captured by the renderer 20. The renderer is comprised of two major portions, a capture component 40 and a playback component 42. The capture component 40 intercepts the calls from the interpreter 16, and stores them in the display list 18. The playback component 42 retrieves the image data from the display list 18, and performs the rendering process to generate the pixel data, which is stored in the frame buffer 22. This pixel data is uncompressed, i.e., at the full bit depth of the printer.

Figure 4:
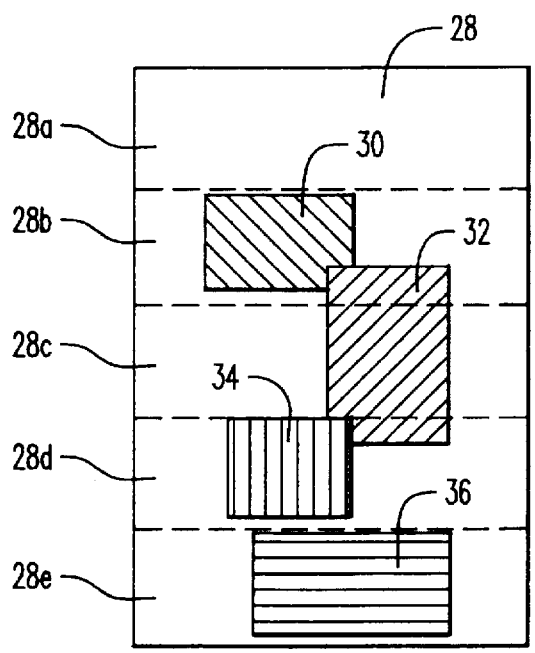
FIG. 4 illustrates an example of a page of an image which is divided into horizontal bands.

In a preferred implementation of the invention, an image is divided into one or more non-overlapping areas, and processed area-by-area. For example, a page can be divided into horizontal bands 28a–28e, as shown in FIG. 4. In the illustrated example, the page is divided into five such bands. In actual practice, the page can be divided into any number of bands. In this regard, the non-overlapping areas need not be horizontal bands. They can have any shape which enables the entire page to be covered. The image data that is stored in the display list is sorted by band.

The playback device 42 retrieves the image data for one band of the page, e.g. descriptions of objects, and renders it to generate the pixel data in the frame buffer 22. This process is repeated for each band, until the frame buffer contains the data for a complete page of the image. If desired, the data for each band can be compressed before it is stored in the frame buffer. The data in the frame buffer 22 is provided to an engine manager 46 at the time the image is to be printed. The engine manager 46 decompresses the data in the frame buffer at print time, if necessary, and provides a video signal to drive the print engine. A controller 48 communicates with the renderer 20 and the engine manager 46 to control the printing operation. The controller functions as a memory manager, and allocates memory for the frame buffer in accordance with the requirements and capabilities of the engine manager, as discussed in detail below.

In the implementation of the present invention, the image data received from the interpreter 16 is analyzed in the capture component 40 to determine whether a relevant segment, such as a page or a band, is comprised solely of bi-level color information. A common example of a bi-level image is a page of text. When the interpreter 16 issues calls to print such a page, all of the appearance state calls contain instructions to print the color black. As such, the entire page consists of only two colors, namely black objects, i.e. text, and a white (or other non-black) background. Although a black and white page of text is the most common example, the invention is applicable to any other type of two-color image, such as an arrangement of yellow objects on a blue background, or an image consisting of two different shades of gray.

In the implementation of the invention, the appearance state calls from the interpreter are examined to determine whether a maximum of two colors are called for. If so, an indication of this fact is stored in the display list 18, along with the calls from the interpreter 16. During playback, the renderer 20 provides an indication to the controller 48 that the image data about to be rendered contains only bi-level color information. In response to the information from the playback device 42 that bi-level color is present, the controller determines whether the engine manager 46 is capable of operating in a bi-level mode, and whether printing conditions are otherwise suitable for use of the bilevel mode. More particularly, an engine manager which is capable of operating in a bi-level mode can receive a single bit which indicates a black or white pixel, for example, and expand it into the appropriate number of bits to drive the engine. Thus, if the printer is capable of generating 16 levels of gray, in the bi-level mode the engine manager expands each bit of data from the frame buffer into a 4-bit signal.

For example, if an image is made up of black characters on a white background, in the bi-level mode the color black might be stored in the frame buffer as a logical one bit, and white pixels might be represented as a logical zero. At print time the engine manager 46 can expand each bit into a corresponding 4-bit signal, e.g. 1111 for black and 0000 for white in the case of a monochrome printer. If, instead, the image is comprised of 50% gray objects on a white background, each logical one bit is expanded to a 50% gray value, e.g., 0111. As another example, in a bi-level color image, a logical one bit might represent blue and a logical zero bit might represent yellow. In this case, the engine manager expands each logical one bit to a 12-bit value for blue, e.g. 1111 1111 0000 (corresponding to 100% cyan, 100% magenta and 0% yellow), and each logical zero bit is expanded to a 12-bit value for yellow, e.g., 0000 0000 1111.

If the engine manager 46 can operate in such a mode, only one bit of data is needed to indicate the display value for each pixel of the image. As such, the rendering time can be significantly reduced, to thereby increase performance. In addition, a much smaller amount of total memory is required. In such a case, therefore, the controller 48 allocates less memory for the frame buffer 22.

Furthermore, the need to compress the data may be eliminated. For example, a page of uncompressed image data having a resolution of 600 dots per inch may require only about 4 megabytes of total memory capacity for the entire frame buffer when the bi-level mode is employed. If the printer has that much memory available, there is no need to compress the pixel data.

However, if the engine manager is not capable of operating in a bi-level mode, all of the information necessary to operate in a normal, full pixel depth mode is available in the display list 18. In this case, the controller 48 allocates sufficient memory to the frame buffer 22 to store the required number of bits per pixel, e.g., twenty-four or thirty-two bits per pixel in a full color printer.

Figure 5:
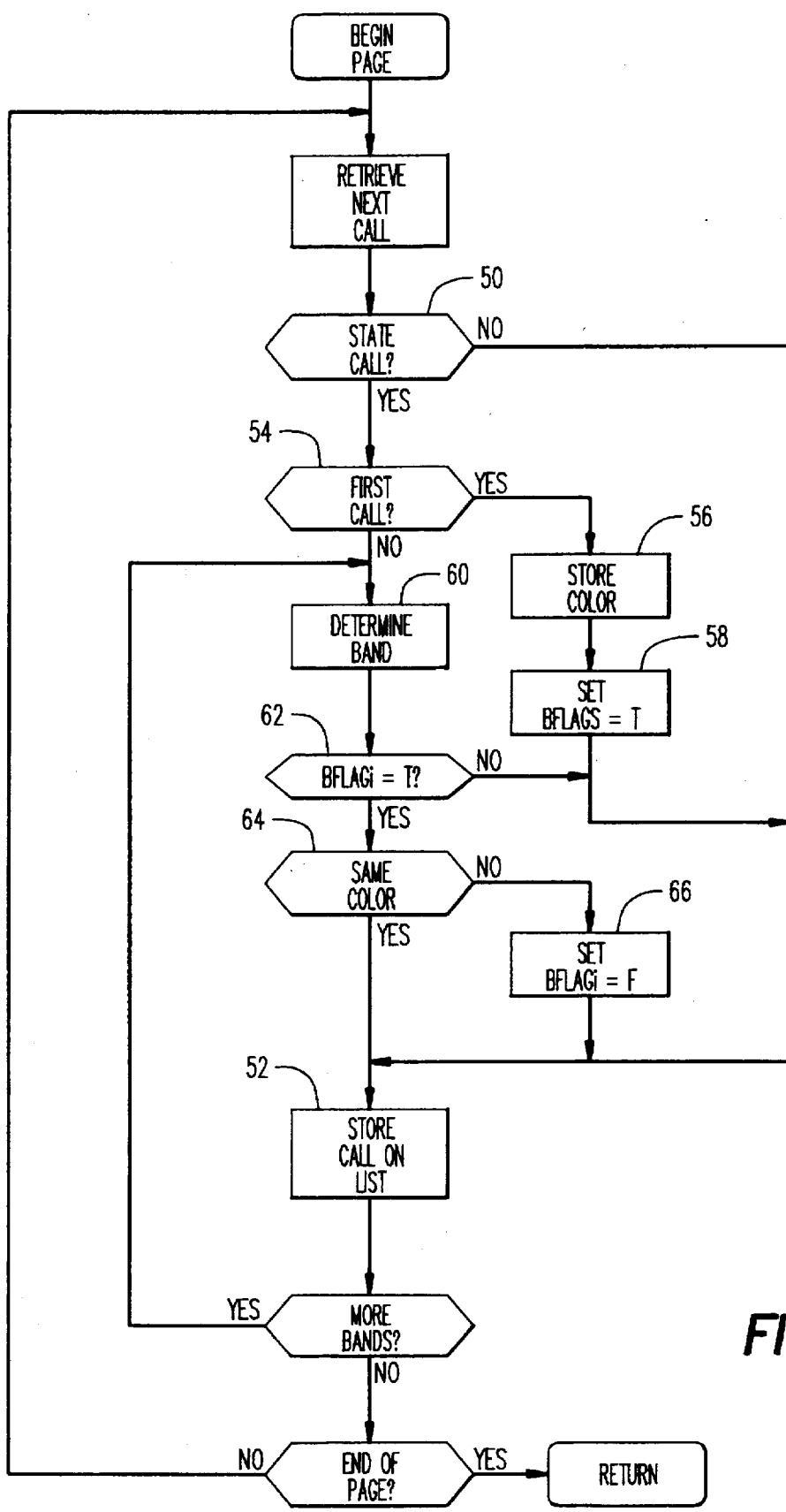
FIG. 5 is a flowchart of a first embodiment of the process of the present invention.

The operation of the capture device 40 to determine whether the incoming image data is bi-level in nature is depicted in the flow chart of FIG. 5. Preferably, the determination is made on a band-by-band basis. After each band is examined and a determination is made, the determinations for all of the bands can be summed to make a final determination for the entire page. Referring to FIG. 5, as each drawing call is received from the interpreter 16, it is examined at Step 50 to determine whether it is a state call, i.e. one that sets the color of the printer. If not, the call is stored in the display list at Step 52 for its band.

If the call from the interpreter is a state call, a check is made at Step 54 whether this is the first state call for the page. If so, the color required by the call, e.g. black, is stored in a buffer at Step 56, and a set of flags for the respective bands are each set to a true state at Step 58. The call is then stored on the display list, at Step 52.

If the retrieved state call is not the first call for the page, a determination is made at Step 60 as to which band, or bands, are affected by the call. Referring to FIG. 4, a call pertaining to the rectangle 30 affects only one band 28b, whereas calls relating to the rectangle 32 cover three bands, 28b, 28c and 28d. The band flag BFLAGi for the first affected band is checked at Step 62 to determine whether it is still in the true state. If not, a determination has already been made that the band does not consist solely of bi-level color data, and the call is stored on the display list for the current band at Step 52. If the flag is in the true state, however, at Step 64 the color that is being called for is compared with the color previously stored in the buffer at Step 56. If they are the same color, the call is merely stored on the display list. If, however, the colors are not the same, the band flag BFLAGi is set to the false state at Step 66 to indicate that the color data for that band is not bi-level, and the call is then stored on the display list. This procedure is repeated for each band that is covered by the state call. Every call is examined in this manner, until the end of the page is reached, i.e. a call to eject the page is received.

At rendering time, the band flags are checked to determine whether the image data is bi-level. Depending upon the capabilities of the engine manager, it may be desirable to operate in the bi-level mode on a band basis or on a page basis. If operation is carried out on a page basis, all of the band flags are checked, to see if they are in the true state. If so, an indication is provided to the controller 48 that the color data is bi-level. In response, the controller allocates memory for a bi-level frame and bi-level rendering takes place. Otherwise, no further action is taken and the rendering process proceeds in the normal, full-bit fashion.

In the foregoing example, only one color is stored at Step 56. In such a case, the second color is that of the paper on which the image is printed, e.g., white. As an alternative, the first two state calls can be stored at Step 56, to store both colors which will comprise the image.

In a preferred embodiment of the invention, when the color data is determined to be achromatic as well as bi-level, it is rendered in the manner disclosed in co-pending application Ser. No. 08/483,453, the disclosure of which is incorporated herein by reference. More particularly, when the color to be printed or displayed is black or another grayscale value, it is not rendered into all three sections of the frame buffer, as shown in FIG. 2. Rather, as disclosed in the related application, the color data is only rendered into one section of the frame buffer, and the rendered data is read from that section for the printing or display of all three colors. In such a case, the printing process is further optimized, through additional reduction of the rendering time.

In the example of FIG. 5, all of the data is examined as it is stored in the display list, and a determination can be made prior to rendering whether the bi-level mode of operation is possible. The process of the present invention is also applicable to output devices which do not utilize a display list, in which case the interpreted calls are sent directly to the renderer. In this case, the bi-level determination is carried out dynamically.

Figure 6:
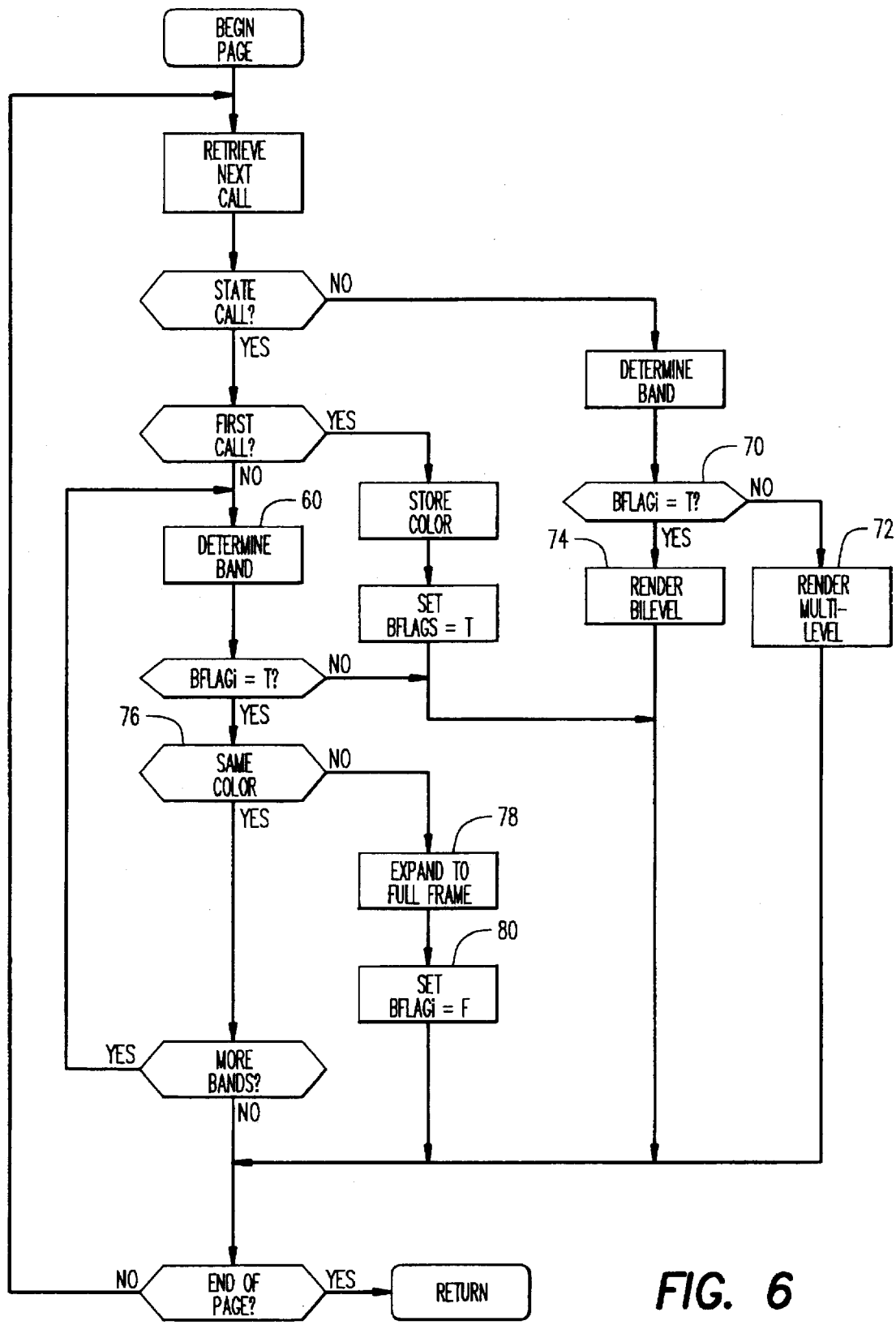
FIG. 6 is a flowchart of a second embodiment of the process of the present invention.

Referring to FIG. 6, in the dynamic mode of operation state calls are examined, as in the process of FIG. 5, and flags are set to indicate whether the color data is bi-level. As each object is rendered the state of the bi-level flag for each band covered by the object is checked at Step 70. If it is false, the object is rendered in the normal, multi-level mode at Step 72. On the other hand, if the flag is true, the object is rendered in a bi-level mode at Step 74, where each pixel is assigned a value of either one or zero.

Whenever a state call requests a change in color, it is checked at Step 76 to determine whether the new color is one of the two previously selected colors. If not, bi-level operation is no longer possible. In this case, a full-bit-depth frame buffer is allocated in memory, and the previously rendered bi-level values are expanded to the full bit depth at Step 78. The flag for the affected bands are set to the false state at Step 80, and from that point on all rendering for the affected bands takes place in the normal, multi-level mode of operation.

From the foregoing, it can be seen that the present invention examines image data prior to or as it is being rendered, in a manner which increases the overall efficiency of the rendering process. By recognizing those situations in which the image is comprised of a maximum of two colors, a bi-level mode of operation can be employed to significantly reduce rendering time, as well as storage requirements for the frame buffer. In such a situation, compression of the image data may not be required, to further increase the speed with which the image generation can be completed. Furthermore, by streamlining the rendering process commensurate with achromatic image data, additional optimization of the process can be attained.

It will be appreciated by those of ordinary skill in the art that the present invention can be embodied in other specific forms without departing from the spirit or essential characteristics thereof. For example, although disclosed with specific reference to its implementation in a printer using CMY color space, the invention is equally applicable to other types of color output devices and other single- or multi-dimensional color spaces. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. In an image output device which represents color by means of a multi-level color space, a process for generating an image, comprising the steps of:

receiving image data which defines objects that form an image to be generated;

storing said image data in an intermediate, non-rendered format and examining said image data as it is being stored in said intermediate format to determine whether it represents a maximum of two colors in an image to be generated;

rendering the image data from said intermediate format into a bi-level format, where each pixel in the image is assigned a data value that is in one of two states and the pixel data values are stored in a memory, when a maximum of two colors are represented;

expanding the stored pixel values into multi-level pixel values; and generating an image using said multi-level pixel values.

2. The method of claim 1 further including the step of storing an indicator with the data in said intermediate format which indicates whether a maximum of two colors are represented.

3. The method of claim 1 wherein said expanding step is carried out after all of the data for the image has been rendered.

4. In an image output device which represents color by means of a multi-level color space, a process for generating an image, comprising the steps of:

receiving image data which defines objects that form an image to be generated;

storing the received image data in an intermediate form;

inspecting said image data to determine whether it represents a maximum of two colors in the image to be generated;

storing an indication of bi-level color data with the stored image data when the received image data represents a maximum of two colors in the image; and retrieving the stored image data and generating a bi-level color map when said indication is stored with the image data.

5. The method of claim 4 wherein said bi-level color map comprises a single-bit display value for each of said picture elements.

6. The method of claim 5 further including the step of expanding said display values into multi-bit values that correspond to components of said color space, and generating an image from said multi-bit values.

7. In an image output device which represents color by means of a multi-level color space, a process for generating an image, comprising the steps of:

receiving image data which defines objects that form an image to be generated;

rendering the image data in a bi-level mode, where each pixel in the image is assigned a data value that is in one of two states, and storing the pixel data values in a memory;

examining said image data while it is being rendered to determine whether it represents a maximum of two colors in an image to be generated;

detecting that more than two colors are represented in said image data;

expanding the stored pixel values into multi-level pixel values in response to said detection; and generating an image using said multi-level pixel values.

8. The method of claim 7 further including the step of rendering additional image data in a multi-level mode after said detecting step, where each pixel is assigned one of multiple states that are greater than two in number.

9. An image producing device of the type in which color is represented in a multi-component color space, comprising:

an interpreter for generating commands to produce images of objects;

a renderer responsive to said commands for storing a pixel map which defines an image of an object for at least one component of said color space;

means for inspecting said commands as they are being rendered to determine whether the images of the objects are comprised of bi-level color;

an image generating unit for generating an image in accordance with information contained in said pixel map;

a controller responsive to said inspecting means for causing said renderer to generate a bi-level pixel map when the image of the data is bi-level in color; and means for expanding bi-level data values stored in said pixel map into multi-level values in response to said inspecting means, before all of the data for the image has been rendered.

10. The image producing device of claim 9 wherein said controller allocates memory for use by said renderer to store said pixel map, wherein the amount of memory that is allocated to said renderer is dependent upon whether the images of the objects are comprised of bi-level color, as determined by said inspecting means.

11. In an image output device which represents color by means of a multi-level color space, a process for generating an image, comprising the steps of:

receiving image data which defines objects that form an image to be generated;

initially rendering the image data in a bi-level mode, where each pixel in the image is assigned a data value that is in one of two states, and storing the pixel data values in a memory;

examining said image data while it is being rendered to determine whether it represents a maximum of two colors in an image to be generated;

detecting that more than two colors are represented in said image data as it is being rendered;

expanding the stored pixel values into multi-level pixel values before all of the data for the image has been rendered;

rendering the remaining data for the image in a multi-level mode after said expanding step; and generating an image using said multi-level pixel values.

12. An image producing device of the type in which color is represented in a multi-component color space, comprising:

an interpreter for generating commands to produce images of objects;

a memory for storing said commands in a non-rendered intermediate format;

means for inspecting said commands to determine whether the images of the objects are comprised of bi-level color;

a renderer for converting said commands in said intermediate format into a bi-level pixel map which defines an image of an object with bi-level data values when said inspecting means determines that the images of the objects are comprised of bi-level color;

an image generating unit for generating an image in accordance with information contained in said pixel map; and means for expanding bi-level data values stored in said pixel map into multi-level values for presentation to said image generating unit.

* * * * *